April 9, 1968   H. E. PAULSON   3,376,946
AUTOMATIC COUPLING MECHANISM MOUNTING MEANS
Filed March 7, 1966                              2 Sheets-Sheet 1
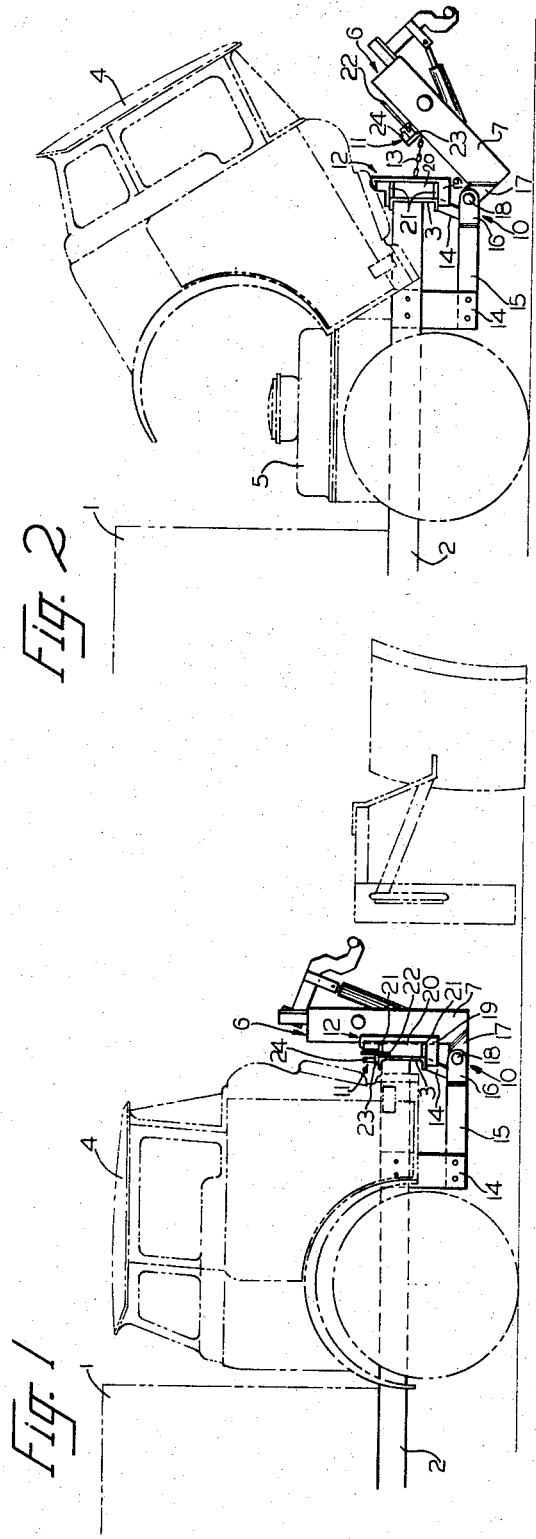
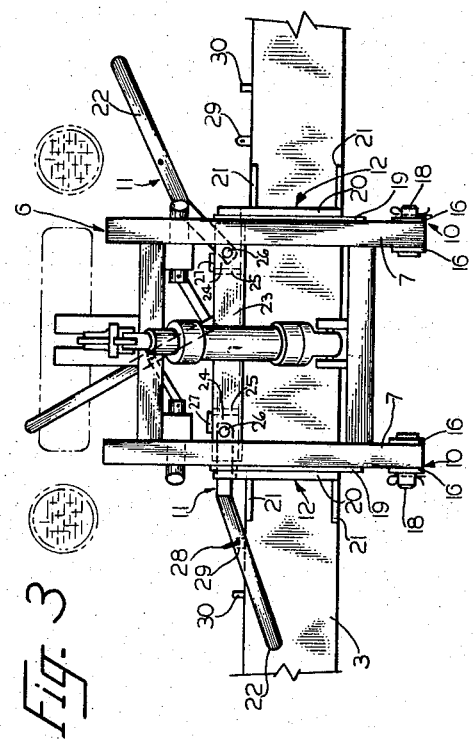
INVENTOR.
HOWARD E. PAULSON
BY
DONALD E. PORTER
ATTORNEY April 9, 1968  H. E. PAULSON  3,376,946
AUTOMATIC COUPLING MECHANISM MOUNTING MEANS
Filed March 7, 1966  2 Sheets-Sheet 2
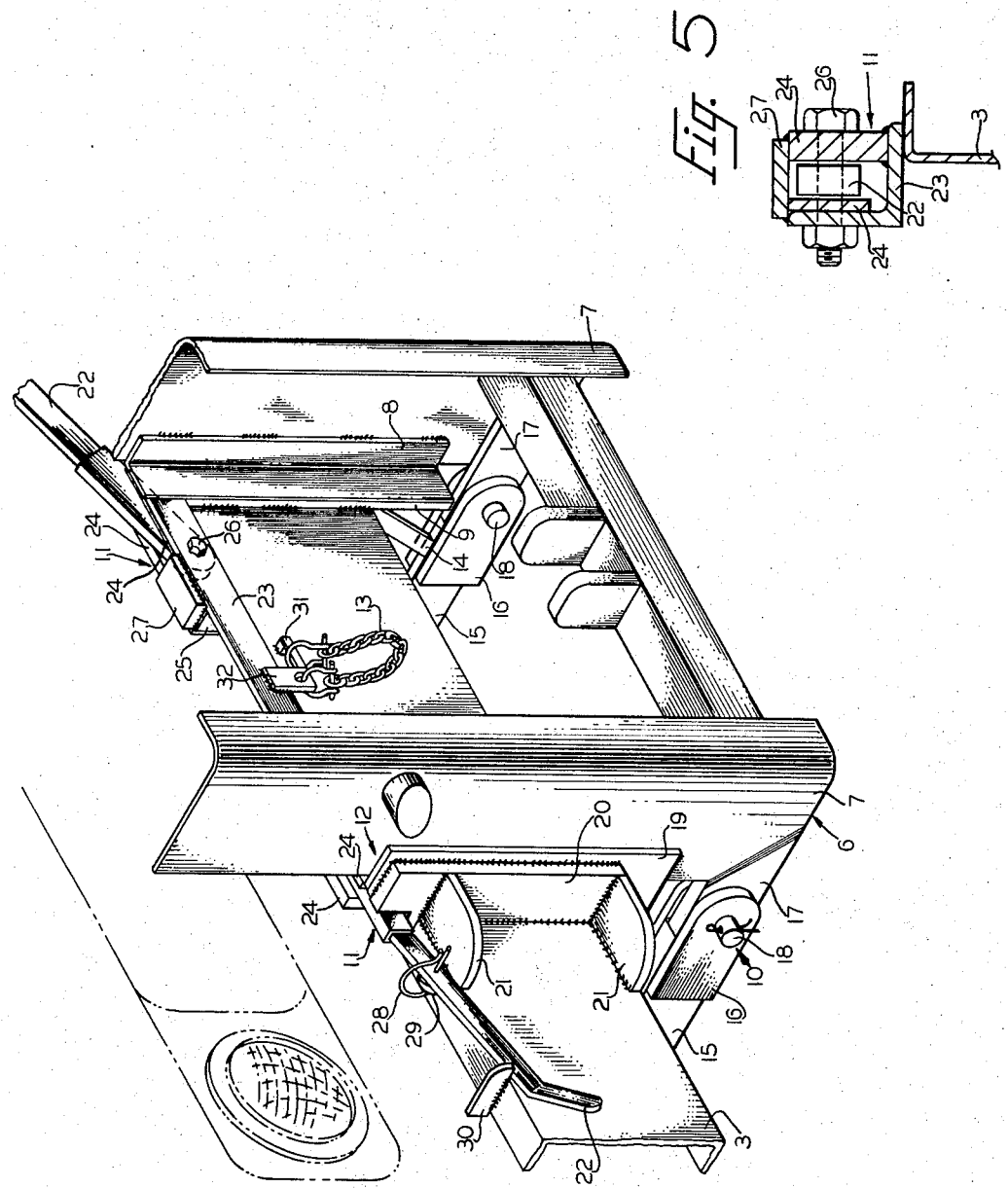
INVENTOR.
HOWARD E. PAULSON
BY
DONALD E. PORTER
ATTORNEY United States Patent Office 3,376,946
Patented Apr. 9, 1968

3,376,946
AUTOMATIC COUPLING MECHANISM
MOUNTING MEANS
Howard E. Paulson, Waukesha, Wis., assignor to Central Engineering Company, Inc., Milwaukee, Wis., a corporation of Wisconsin
Filed Mar. 7, 1966, Ser. No. 532,205
6 Claims. (Cl. 180—89)

ABSTRACT OF THE DISCLOSURE

Means for hingedly mounting the coupling frame of an automatic coupling mechanism for snowplows and the like on a cab-over-engine truck immediately forward of the front end thereof, including hinge means pivotally connecting the coupling frame to the truck chassis for pivoting the coupling frame away from the front end of the truck to permit the cab to be tilted forwardly; and locking means for releasably locking the coupling frame in its normal upright position and for preventing any lateral movement thereof.

This invention relates to means for mounting the coupling frames of automatic coupling mechanisms for snow plows and the like on motor vehicles and, more particularly, to means for mounting such coupling frames on the front of cab-over-engine type motor vehicles.

The use of automatic coupling mechanisms to support snow plows and other implements at the front of motor vehicles is known in the art. One type of automatic coupling mechanism is shown in Patent No. 2,710,464 issued June 14, 1955, to L. J. Hutsing. It comprises a coupling frame rigidly attached to the frame rails of a vehicle in an upright position immediately forward of the front bumper of the vehicle; and an implement frame attached to the rear of an implement, such as a snow plow. The implement frame is designed and constructed to automatically receive, enclose and be held by the coupling frame when the coupling frame is inserted into the implement frame by the forward motion of the vehicle, and to move upwardly and downwardly relative to the coupling frame. The implement frame and the implement thereby are held in close proximity and rigid upright and horizontal relationship to the front of the vehicle, which are essential for the insertion of the coupling frame into the implement frame, for the upward and downward movement of the implement frame (and, therefore, the implement) and for accurate control of the vehicle's direction of travel. However, on a cab-over-engine type vehicle having a tiltable cab, the coupling frame must be mounted on frame rail extensions extending several feet forward of the front of the cab, so that the cab front will not strike the coupling frame when the cab is tilted forward. The extension of the length of the frame rails substantially increases the bending moments in the sections thereof between the vehicle's front wheels and the coupling frame. As a consequence, it is difficult for the driver to accurately steer the vehicle when (for example) an angled snow plow is mounted and used to plow snow to one side of the vehicle, and the combined weight of the coupling frame, the implement and the implement tend to twist and bend the frame rail extensions to an extent that, in time, the driver encounters difficulties in inserting the coupling frame into the implement frame and in raising and lowering the implement.

The present invention provides means for mounting the coupling frame of an automatic coupling mechanism on a cab-over-engine type vehicle in close proximity to the front of the tiltable cab thereof. Hinge assemblies are provided which pivotally connect the coupling frame to the chassis of the vehicle and permit the coupling frame to be pivoted forward and away from the coupling frame's normal upright position, in which the coupling frame protrudes forward of the front of the vehicle, to a forwardly pivoted position to provide clearance for the front of the cab when the cab is tilted forward. A tether may be attached to and extend between the chassis and the coupling frame to support the coupling frame in a forwardly pivoted position in which the included angle between the coupling frame and the normal upright position thereof less than ninety degrees, and to limit further forward pivoting thereof, in order that the coupling frame may be pushed, rather than lifted, from the forwardly pivoted position when being pivoted rearwardly to its normal upright position. When the coupling frame is pivoted rearwardly on the hinge assemblies to its normal upright position, locking means, comprised of lever assemblies having levers engageable with latch assemblies, are provided to releasably lock the coupling frame in such position and in rigid upright and horizontal relationship to the front of the vehicle.

The best mode presently contemplated of carrying out the invention is illustrated in the accompanying drawings in which FIGURE 1 is a side elevational view of the forward end of a cab-over-engine type motor truck embodying the present invention, with the cab in its normal horizontal operating position, and illustrating the coupling frame locked in its normal upright position protruding forward of the front of the truck.

FIGURE 2 is a view similar to FIGURE 1, but with the cab tilted forward and illustrating the coupling frame supported in its forwardly pivoted position by the tether.

FIGURE 3 is a fragmentary front elevational view of the motor truck shown in FIGURE 1, illustrating the coupling frame in its normal upright position, with the lever of one of the lever assemblies fully lowered and engaged with one of the latch assemblies, and with the lever of the other lever assembly fully raised and released from engagement with the other latch assembly.

FIGURE 4 is a fragmentary perspective view of the motor truck and coupling frame shown in FIGURE 3, with parts of the coupling frame broken away and other parts thereof eliminated to illustrate details of construction.

FIGURE 5 is an enlarged sectional view through one of the lever assemblies in its locking position.

The automatic coupling mechanism mounting means are mounted on a self-propelled truck or like vehicle 1 having chassis means, including frame rails 2 having a front bumper 3 rigidly connected to the forward ends thereof. A cab 4 is tiltably mounted on the truck 1 in the conventional manner so that, when desired, the cab may be tilted forward from the cab's normal horizontal operating position to a forwardly tilted position and access afforded to the engine 5, which the cab 4 normally encloses.

The automatic coupling mechanism may be of any suitable type and, as illustrated herein, is of the type claimed in Patent No. 2,710,464 and includes a coupling frame 6 having a pair of upright frame members 7. When the coupling frame 6 is in its normal upright position, in which the upright frame members 7 protrude forward of the front end of the truck 1, as shown in FIGURE 4, L-shaped members 8 welded to the inner vertical surfaces of the upright frame members 7 abut against L-shaped members 9 welded to the front surface of the front bumper 3, which in the illustrated embodiment defines the front end of the truck 1. Hinge assemblies 10 are provided between the upright frame members 7 of the coupling frame 6 and the chassis means of the truck 1, to permit the driver of the truck 1 (after unlocking the coupling frame 6 from its normal upright position by releasing lever assemblies 11 from engagement with latch assemblies 12) to pivot the coupling frame 6 on the hinge assemblies 10 forward and away from its normal upright position adjacent the front surface of the front bumper 3 to a limit established by the length of a tether 13 between the chassis means and the coupling frame 6. When such limit is reached, the coupling frame 6 is in its forwardly pivoted position, which will permit the cab 4 to be tilted forward without striking the coupling frame 6, and the coupling frame 6 is supported in the forwardly pivoted position by the tether 13. When the cab is tilted rearwardly, the coupling frame 6 may be pivoted rearwardly on the hinge assemblies 10 to its original, normal upright position and releasably locked to the chassis means of the truck 1 in such position by again engaging the lever assemblies 11 with the latch assemblies 12.

Hinge assemblies

Although it is contemplated that the present invention encompass apparatus in which the hinge assemblies 10 are located in other positions with respect to the chassis means of the truck 1 (as, for example, in positions adjacent the front or top of the front bumper 3), it is preferred to locate the hinge assemblies below the horizontal plane of the front bumper 3, in order thereby to define a relatively low axis of pivoting for the coupling frame 6, which will provide a large amount of clearance between the coupling frame 6, in its forwardly pivoted position, and the cab 4, in its forwardly tilted position. In order to locate and support each of the hinge assemblies 10 below the horizontal plane of the bumper 3, plates or rails 14 are rigidly connected to and extend below the frame rails 2 and bumper 3, respectively; and forwardly extending horizontal beams 15 are rigidly connected, at their rear ends, to the plates 14. Arms 16 are welded to the forward end of each beam 15 to form a bifurcated end thereof, and the rear end of a horizontal beam 17 is pivotally connected to the bifurcated end of beam 15, below the bumper 3, by means of pin 18. The front end of each of the beams 17 is fixedly connected (as by welding) to the base of an upright frame member 7 of the coupling frame 6.

Locking means

Locking means are provided for releasably locking the coupling frame 6 rigidly in its normal upright position adjacent the front surface of the front bumper 3 of the truck 1, and for preventing any forward pivoting or any lateral movement of the coupling frame 6 horizontally transverse to the center-line of the truck 1 when the coupling frame 6 is in its normal upright position.

Various locking means (such as, for example, hooks mounted on the coupling frame and capable of hooking engagement with the bumper, and a single lever assembly having a lever engageable with the latching surfaces of one or more latch assemblies) are contemplated as being within the scope of the present invention. However, it is preferred to employ a pair of lever assemblies 11, which are quickly and effortlessly engageable and disengageable with the latching surfaces of a pair of latch assemblies 12, and which are not prone to warpage, distortion or stretching and do not require periodic inspection and adjustment.

The lever assemblies 11 may be mounted on the front bumper 3 and the latch assemblies 12, on the coupling frame 6. However, it is preferred to employ the converse thereof and to mount the relatively fragile lever assemblies 11 on the coupling frame 6 and the more substantially constructed latch assemblies 12 on the bumper 3, so that, in the event that it is desired to completely demount the coupling frame 6 from the truck 1, the lever assemblies 11 also will be removed from the truck 1 and will not remain on the front bumper 3 where they would be exposed to damage in the event of a front-end collision between the truck 1 and another object. In addition, pivoting the coupling frame 6 to its forwardly pivoted position thereby will move the lever assemblies 11 forward and away from the front of the cab 4 to a position in which the lever assemblies 11 will not interfere with the forward tilting of the cab 4.

The latch assemblies 12 include two vertical thrust plates 19, which are welded to the front of the front bumper 3 at points intermediate the opposite ends of the bumper 3 a distance from one another sufficiently to permit the inside vertical surfaces of the vertical thrust plates 19 to slidably abut the outside vertical surfaces of the upright frame members 7 when the coupling frame 6 is in its normal upright position. The vertical thrust plates 19 thereby prevent any lateral or horizontally transverse movement of the coupling frame 6 in a horizontal direction when in its normal upright position. Additional bracing for the vertical thrust pates 19 against such lateral movement is provided by side thrust backing plates 20, which are welded to the front of the truck bumper 3 and to the outside surfaces of the bumper thrust plates 19, and by horizontal gussets 21, which are welded to the front of the bumper 3 and to the outside surfaces of the side thrust backing plates 20. The upper portions of the vertical thrust plates 19 and the side thrust backing plates 20 extend above the top of the bumper 3. The rear edges thereof provide latching surfaces, which the levers 22 of the lever assemblies 11 may engage and abut against to lock the coupling frame 6 in its normal upright position; and the forward edges thereof have the additional utility of acting as overriders for the bumper 3, to protect the front of the cab 4 when the coupling frame 6 is completely demounted from the truck 1.

The lever assemblies 11 include a horizontal cross-brace 23 which, as shown, is in the shape of an L-shaped member. The cross-brace 23 is welded to the rear edges of the upright frame members 7 in a position such that the underside of the cross-brace 23 will overlie the top of the front bumper 3 when the coupling frame 6 is in its normal upright position. The outer edges of the cross-brace 23 respectively are in virtually the same vertical planes as the outside surfaces of the upright frame members 7 in order that, when the coupling frame 6 is pivoted to or from its normal upright position, the outer edges of the cross-brace 23 will not strike the upper portions of the vertical thrust plates 19.

Pairs of rectangular metal spacers 24 are positioned on the cross-brace 23, with each pair adjacent to but not overlapping an outer edge of the cross-brace 23. The rear spacer 24 in each such pair is welded to the upper horizontal surface of the L-shaped cross-brace 23 adjacent the rear edge thereof and is held in fixed spacial relationship to the rear vertical surface of the L-shaped cross-brace 23 by a tie gusset 25 welded to the rear spacer 24 and to the rear vertical surface. The other or front spacer 24 in the pair is held adjacent the rear vertical surface of the L-shaped cross-brace 23 by a pin 26, which is inserted through the rear spacer 24 in the pair, the front spacer 24 therein and the cross-brace 23. A lever 22 (which, as shown, is in the shape of a rectangular steel bar) is pivotally mounted on the pin 26 between each of the spacers 24 in the pair, so that the lever 22 may be pivoted in a plane parallel to the rear edges of the upright frame members 7. When the coupling frame 6 is in its normal upright position and the lever 22 is pivoted downwardly to its fully lowered position, the lever 22 will engage and abut against the rear edges of the upper portions of the vertical thrust plate 19 and side thrust backing plate 20 adjacent the lever 22, thereby locking the coupling frame 6 in its normal upright position. When the lever 22 is pivoted upwardly to its fully raised position, the upper edge of the lever 22 encounters a stop-block 27, which is welded across the upper edges of the rear spacer 24 and of the cross-brace 23 adjacent the tie gusset 25 and which provides a limit for such upward pivoting. When the lever 22 strikes the stop-block 27, the lever 22 will have been pivoted upwardly through an arc of sufficient length to assure that, when the coupling frame 6 is pivoted from or to its normal upright position, the upwardly pivoted lever 22 will not strike the tops of the upper portions of the vertical thrust plate 19 and the side thrust backing plate 20 adjacent the lever 22.

When a lever 22 is in its fully lowered position, cotter pins 28 may be inserted through the lever 22 and through a cleat 29 welded to the top of the bumper 3 adjacent the lever 22 to hold the lever 22 in such position and to prevent the lever 22 from pivoting upwardly. Further means for preventing the lever 22 from pivoting upwardly from its fully lowered position is provided by a bumper lug 30, having a curved face. The bumper lug 30 is welded to the top of the bumper 3 outside of the cleat 29 and extends forward of the front surface of the bumper 3 in a position such that, when the lever 22 is pivoted downwardly toward its fully lowered position, the lever 22 will strike the curved face of the lug 30 and will bend forward, away from the front surface of the bumper 3, due to the camming action of the curved face of the lug 30. As the lever 22 continues to be pivoted downwardly, the lever 22 will clear the curved face of the lug 30 and will spring rearwardly and lock under the lug 30.

*Tether*

A tether 13 is provided to support the coupling frame 6 in a forwardly pivoted position in which the included angle between the forwardly pivoted position and the normal upright position of the coupling frame 6 is less than ninety degrees, in order that the coupling frame 6 may be pushed, rather than lifted, from the forwardly pivoted position when being pivoted rearwardly to the normal upright position. As shown, the tether 13 comprises a chain; but it is contemplated that, without departing from the invention, the tether may be some other device (such as, for example, a cable) which is extensible to a predetermined length. Means for connecting the tether 13 to the chassis means of the truck 1 and to the coupling frame 6 are provided by a metal loop 31 welded to the front surface of the bumper 3, to which one end link of the tether 13 is connected, and by a metal loop 32 welded to the cross-brace 23 on the coupling frame 6, to which the other end link of the tether 13 is connected. The length of the tether 13 is determined by the amount of forward pivoting of the coupling frame 6 which is desired to provide clearance for the cab 4 when the cab 4 is tilted forward.

*Operation of mounting means*

The following is a brief summary of the operation of the mounting means.

If, while the coupling frame 6 is in its normal upright position and inserted in an implement frame, it is desired to tilt the cab 4 forwardly, the coupling frame 6 is withdrawn from the implement frame in the manner described in Patent No. 2,710,464. The cotter pins 28 then are removed from the cleats 29 and the levers 22. The levers 22 are pulled forwardly (away from the front surface of the bumper 3) and upwardly (over the curved faces of the bumper lugs 30) and pivoted upwardly to their fully raised positions, in which the upper edges of the levers 22 respectively encounter the stop-blocks 27. The lever assemblies 22 thereby are released from engagement with the latch assemblies 12. The coupling frame 6 then may be pivoted forwardly on the hinge assemblies 10 to the limit permitted by the length of the tether 13, which determines the forwardly pivoted position of the coupling frame 6. The cab 4 then may be tilted forward about its horizontal axis to the extent required to gain access to the engine 5.

When the work on the engine 5 has been completed, the cab 4 may be rearwardly tilted to its normal horizontal operating position and secured in such position in the conventional manner. The coupling frame 6 may be pushed upwardly toward the front of the cab 4 and thereby pivoted on the hinge assemblies 10 to its normal upright position, in which the underside of the cross-brace 23 overlies the top of the truck bumper 3, the L-shaped members 8 and 9 (respectively on the upright frame members 7 and the bumper 3) abut each other, and the inside vertical surfaces of the vertical thrust plates 19 abut the outside vertical surfaces of the upright frame members 7. By pivoting each of the levers 22 downwardly to its fully lowered position below a bumper lug 30, the levers 22 are engaged behind the rear edges of the vertical thrust plates 19 and the side thrust backing plates 20. The cotter pins 28 then are inserted through the cleats 29 and the levers 22. The coupling frame 6 thereby is locked to the vertical thrust plates 19 and the side thrust backing plates 20 and in its normal upright position adjacent the front surface of the bumper 3. The truck 1 then may be driven forward and the coupling frame 6 reinserted into the implement frame in the manner described in Patent No. 2,710,464.

Various modes for carrying out the invention are contemplated as being within the scope of the following claims, particularly pointing out and distinctly claiming the subject matter which is regarded as the invention.

I claim:
1. In a cab-over-engine type vehicle having chassis means and a cab mounted on the vehicle adjacent the front end thereof for tilting movement to and from a forwardly tilted position,
    a coupling frame, including upright frame members, of an automatic coupling mechanism of the type having an implement frame mounted on a snowplow or the like and adapted to receive and be automatically coupled to the coupling frame when the coupling frame is inserted into the implement frame,
    hinge means pivotally connecting the coupling frame to the chassis means for pivoting the coupling frame between a normal upright position, in which the upright frame members protrude forward of the front end of the vehicle, and a forwardly pivoted position to provide clearance between the coupling frame in its forwardly pivoted position and the cab in its forwardly tilted position, and
    locking means for releasably locking the coupling frame in its normal upright position and for preventing lateral movement of the coupling frame when in its normal upright position.

2. The apparatus as described in claim 1 in which the chassis means include a front bumper and the hinge means are located below the horizontal plane of the front bumper.

3. In a cab-over-engine type vehicle having a cab mounted on the vehicle adjacent the front end thereof for tilting movement to and from a forwardly tilted position, and having chassis means including a front bumper member having a front surface,
    a coupling frame member of an automatic coupling mechanism of the type having an implement frame mounted on a snowplow or the like and adapted to receive and be automatically coupled to the coupling frame member when the coupling frame member is inserted into the implement frame,
    hinge means pivotally connecting the coupling frame member to the chassis means for pivoting the coupling frame member between a normal upright position adjacent the front surface of the front bumper and a forwardly pivoted position to provide clearance between the coupling frame member in its forwardly pivoted position and the cab in its forwardly tilted position, and
    locking means, including latch assemblies mounted on one of the members and having latching surfaces and lever assemblies mounted on the other of the members and having levers engageable with the latching surfaces when the coupling frame member is in its normal upright position, for releasably locking the coupling frame member in its normal upright position and for preventing lateral movement of the coupling frame member when in its normal upright position.

4. The apparatus as described in claim 3 in which the lever assemblies are mounted on the coupling frame member and the latch assemblies are mounted on the front bumper member.

5. The apparatus as described in claim 4 in which the latch assemblies include vertical thrust plates mounted on the front surface of the front bumper member and adapted to abut vertical surfaces of the coupling frame member when in its normal upright position and the coupling frame member protrudes forward of the vertical thrust plates.

6. The apparatus described in claim 5 in which the vertical thrust plates extend above the bumper.

References Cited

UNITED STATES PATENTS

| | | | |
|---|---|---|---|
| 2,699,615 | 1/1955 | Malvese | 180—89 X |
| 3,005,511 | 10/1961 | Riedy | 180—89 |
| 3,201,878 | 8/1965 | Markwardt | 37—42 |

LEO FRIAGLIA, *Primary Examiner.*

UNITED STATES PATENT OFFICE
CERTIFICATE OF CORRECTION

Patent No. 3,376,946                                April 9, 1968

Howard E. Paulson

It is certified that error appears in the above identified patent and that said Letters Patent are hereby corrected as shown below:

Column 1, line 33, "Hutsing" should read -- Husting --; line 63, after "implement", first occurrence, insert -- frame --. Column 3, line 54, "example" should read -- examples --.

Signed and sealed this 5th day of August 1969.

(SEAL)
Attest:

Edward M. Fletcher, Jr.                       WILLIAM E. SCHUYLER, JR.
Attesting Officer                                    Commissioner of Patents